March 3, 1953        C. W. HANSEN        2,630,351
FAN TYPE ELEVATOR FOR CHOPPED MATERIAL
Filed April 30, 1947        2 SHEETS—SHEET 1
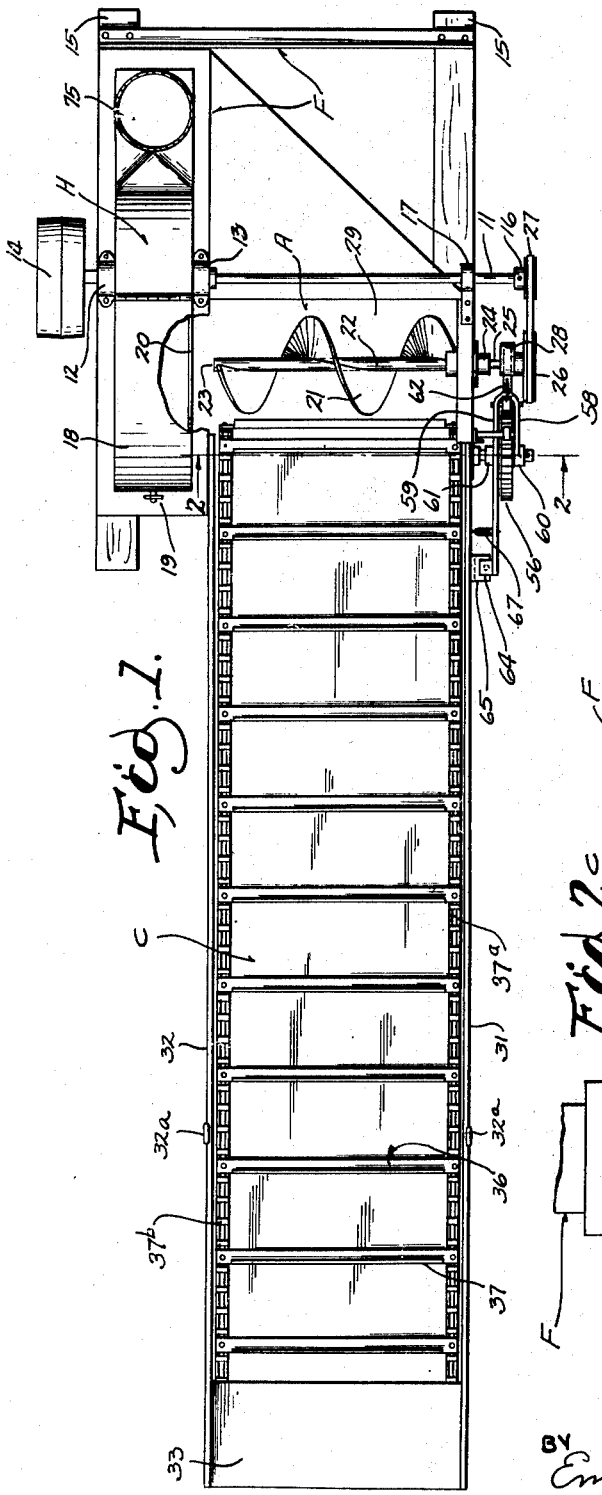
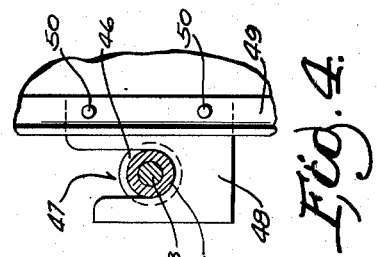
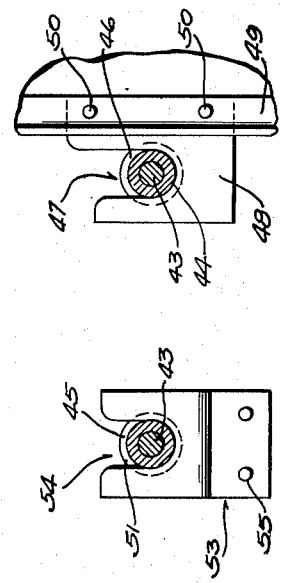
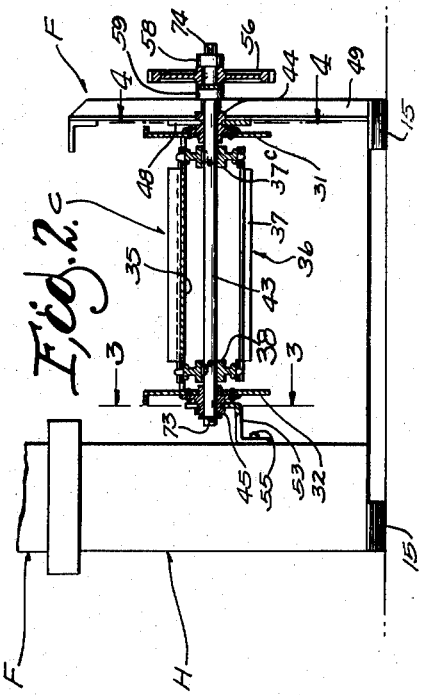
INVENTOR
Charles Wm Hansen
BY Emerson B Donnell
ATTORNEY

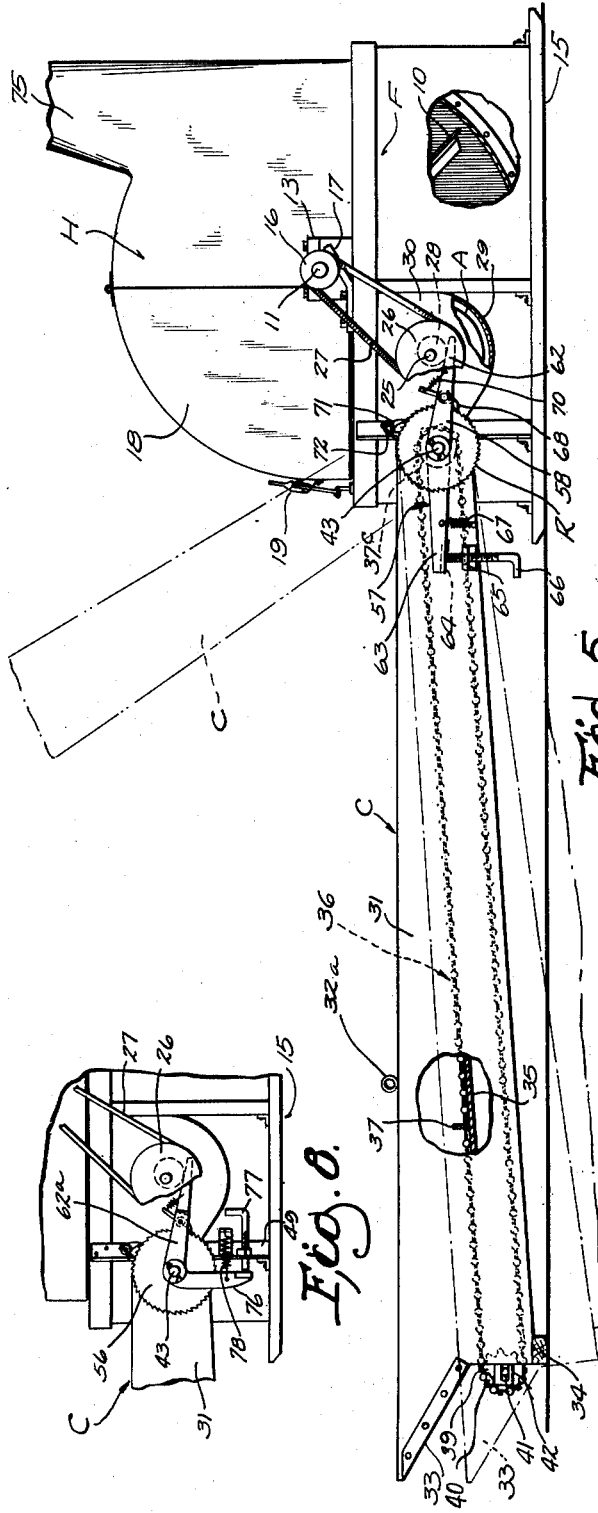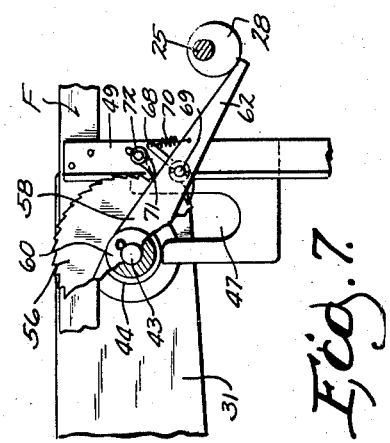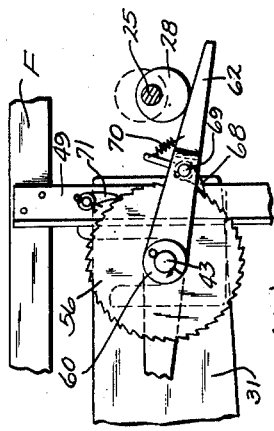

Patented Mar. 3, 1953

2,630,351

UNITED STATES PATENT OFFICE 2,630,351

FAN TYPE ELEVATOR FOR CHOPPED MATERIAL

Charles W. Hansen, Racine, Wis., assignor to J. I. Case Company, Racine, Wis., a corporation of Wisconsin Application April 30, 1947, Serial No. 745,058

10 Claims. (Cl. 302—37)

This invention relates to ensilage blowers and particularly to such devices having a conveyor upon which the previously cut material is deposited.

One object of this invention is to provide an ensilage blower having a conveyor that can be removed for transportation.

Another object is to provide an ensilage blower which will allow a considerable quantity of cut material to be deposited upon the conveyor without choking the fan.

Another object is to provide an ensilage blower having means for feeding the material to the fan including means to adjust the rate of feed relatively to the speed of the fan.

Another object is to provide a construction that is not dangerous, should a person fall onto the conveyor apron.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

Referring to the drawings,

Figure 1 shows a plan view of a device embodying the invention.

Fig. 2 is a section at 2—2 of Fig. 1.

Fig. 3 is a section at 3—3 of Fig. 2.

Fig. 4 is a section at 4—4 of Fig. 2.

Fig. 5 is an elevational view of the device, of Fig. 1, with parts broken away.

Fig. 6 is a similar enlarged view of the ratchet feed mechanism.

Fig. 7 is a similar view with parts broken away showing the conveyor being removed for transportation.

Fig. 8 is a view similar to Fig. 6, showing a modified arrangement.

An ensilage blower is employed for the purpose of depositing forage crops or ensilage into a silo, the blower commonly being located at the base of the silo and ensilage cut in the field from the standing or windrowed crop being brought to the blower in wagons or trucks. The ensilage is then forked or dumped onto the conveyor of the blower and carried into the fan and blown up into the silo.

One difficulty encountered in feeding the blower is that an excessive amount of material will choke the fan and stop the feeding of material to the silo. To prevent this it has been the practice for the trucker to fork the material onto the conveyor gradually to avoid the choking, which forking consumes valuable time that could be otherwise used for hauling ensilage. The invention under consideration avoids the above difficulty and it is believed that it is an improvement over blowers at the present available.

Generally, this invention comprises a fan having a housing H which is mounted upon a suitable frame F. A conveyor C carries the cut material to the auger A and the latter conveys the material into the fan by which it is blown to the silo through a blower pipe similar to that used with a common silo filler.

An important feature of this invention is that it is possible to dispense with the degree of care usually necessary in devices of this type to avoid over-feeding and clogging, and in fact it is often possible to deposit a large quantity of material onto the conveyor C and leave for another load, the deposited material feeding automatically at a rate acceptable to the blower. This is possible because of the adjustable intermittent ratchet means R. With this invention the feed of the conveyor C can be adjusted so as to feed no more material than can be efficiently blown by the fan so that choking can be avoided.

The invention will now be described in detail.

The blower proper comprises a housing H surrounding a fan 10, the latter being mounted for rotation with shaft 11. Bearings 12 and 13 support shaft 11, the latter being rotated by a pulley 14 by a suitable belt (not shown since it forms no part of the invention) from an outside source of power. A frame generally designated as F supports the fan and the other members of the blower. The blower as a unit is mounted in this instance upon skids 15 for convenience in transporting. Shaft 11 of fan 10 extends from the fan housing H to a point beyond the end of frame F and in this instance terminates in a pulley 16. A bearing 17 supports the outer end of shaft 11 and is secured to the end of frame F.

Housing H has a cover 18 of a suitable type to facilitate making adjustments and inspection, and a latch 19 of the conventional type to hold cover 18 securely in place, as more particularly described in the application of Verbeten et al., Serial No. 709,516, filed November 13, 1946. Housing H has an inlet 20 into which auger A conveys the cut material.

Auger A is of a design having a flight 21 and a core 22. The inner end 23 of auger A is unsupported and therefore offers no obstacle to the entrance of material into fan 10. A bearing 24 supports the journal portion of a shaft 25, which extends from bearing 24 as shown, and carries a pulley 26 at the end thereof. A V belt or other suitable means of drive 27 connects pulleys 16 and 26, thus completing the drive from pulley 14 to auger A.

A cam or eccentric 28 is secured to shaft 25 so as to rotate therewith, it being possible to make it integral with pulley 26 if desired, so as to simplify the manufacturing process. Cam 28 may be of various well-known shapes within the contemplation of the invention, an ordinary eccentric being satisfactory, while certain constant lift contours are known to avoid pounding in ratchet drives of the disclosed type. A trough 29 partially encloses and is spaced from the auger A a convenient distance and has an end wall 30 to which bearing 24 is secured.

Conveyor C is so made that it can be removed from the frame F for convenience in transportation as shown in Fig. 7, and can be swung upwardly to allow a truck or wagon to pass. An eyelet 32a is secured to the conveyor C to cooperate with a hoist, not shown, by which the conveyor can be raised. After the truck has passed, the conveyor can be lowered and the load of material dumped upon the apron. This procedure avoids the necessity for backing the vehicle into position, which operation is not always convenient or even possible. This conveyor has a trough-like frame comprising side members 31 and 32 and an end member 33. A member 34 forms a support for the conveyor C when the latter rests upon the ground in working position. A floor 35 of metal, preferably fixed at its edges to members 31 and 32, extends the full length of the conveyor C and serves to support the load of material. An apron or raddle 36 is mounted as shown and can be of any suitable design and in the present instance having slats 37 to propel the cut ensilage toward the auger A, the slats being spaced and actuated by chains 37a and 37b mounted upon sprockets 37c, 38, 39 and 40. Sprockets 39 and 40 are secured to a shaft 41 and well-known means 42 is employed to provide for shifting of shaft 41 for securing the proper tension for the apron 36.

A shaft 43 supports the conveyor C relative to the frame F and housing H, this shaft 43 carrying the drive for apron 36 and being journaled in bearing members 44 and 45. Bearing 44 has an annular groove 46 which freely engages a slot 47 in a bracket 48, secured to an upright angle member 49 by bolts or rivets 50 and forming a part of frame F. Bearing 45 has a similar groove 51 and is freely mounted in a bracket 53 in a slot 54. Bolts 55 secure bracket 53 to housing H. The above mentioned bearing arrangement is intended for the purpose of easily removing the conveyor C for transportation and to also allow the upward swinging thereof for convenient passage of a wagon or truck previous to unloading. By reference to Fig. 5, it is clear that the construction described allows the conveyor C to conform to irregularities of the ground. If the ground is low adjacent to the blower housing the conveyor C will assume the position shown by the dotted lines, while, if the ground is high it will assume an upwardly inclined position, as will be apparent. Bearings 44 and 45 are secured to side members 31 and 32 by any suitable means such as bolts or rivets. Sprockets 37c and 38 are suitably keyed or otherwise fixed to shaft 43.

A ratchet wheel 56 is also fixed to shaft 43, and is employed to obtain the necessary slow feed of the apron 36. A bifurcated ratchet lever 57 having arms 58 and 59, is freely journaled on shaft 43 by bosses 60 and 61 so as to rotate about shaft 43 and has a portion 62 extending forwardly and engaging the above mentioned cam 28 so as to follow the latter. An arm 63 forming a continuation of arm 59 extends rearwardly from boss 61 and terminates in a pad 64. A bracket 65 is secured to side member 31 by suitable means such as bolts, rivets or welding, and a stop screw 66 is threaded into bracket 65 and engages pad 64. Screw 66 is provided with a handle as shown for readily adjusting its position. A spring 67 maintains a contact between pad 64 and the end of screw 66 when permitted by cam 28, so that adjustment of the screw will regulate the amount of rotation of ratchet lever 57 by holding the latter at various distances from cam 28. A drive pawl 68 is pivoted on a pin 69 in the present instance intermediate bifurcated arms 58 and 59 and engages ratchet wheel 56. A tension spring 70 maintains operative engagement between the pawl 68 and ratchet wheel 56.

It is readily seen that if extension 62 is free to follow cam 28, ratchet wheel 56 will be rotated the full number of teeth within the range of the cam 28. If less rotation is desired, screw 66 is adjusted so that extension 62 is spaced from cam 28, the result being that only a part of the throw of cam 28 is utilized and thus the apron 36 will move forward a less amount. Screw 66 is of a length sufficient to allow proper feed adjustment when the conveyor C assumes an angle with the horizontal as shown by the dotted lines in Fig. 5.

A back-lash pawl 71 engages ratchet wheel 56 so that counter-clockwise rotation of ratchet bar 57 will not tend to turn ratchet wheel 56 counter-clockwise. Pawl 71 is mounted upon a stud 72 which stud is secured to angle member 49. A cotter or other suitable means is used to retain pawl 71 against displacement. Cotter pins 73 and 74 serve to prevent axial displacement of the parts on shaft 43.

Fig. 8 shows a modification in which the feed adjusting screw is located on frame F. This construction allows the conveyor to follow ground irregularities without affecting the feed adjustment. In this modification, bifurcated lever 62a is made with an arm 76 extending downwardly. A screw 77 passes through member 49 and engages arm 76. A spring 78 urges arm 76 against screw 77.

When it is desired to allow a truck or wagon to pass, the conveyor C can be lifted from the ground at the outer end thereof and lowered when the truck or wagon is in position for dumping. Eyelets 32a are secured to side members 31 and 32 so that a hoist can be connected to them to raise the conveyor to the desired angle.

Housing H has an outlet 75 to which is attached the customary blower pipe. This is not shown as it is not a part of this invention. This invention contributes to the safety of those persons working about the blower for the reason that if a person should accidentally fall onto the apron, the slow intermittent feed will allow him sufficient time to get off again before he reaches the comparatively rapidly rotating auger A.

The above being a complete description of an illustrative embodiment of the invention, what is claimed as new and desired to be secured by Letters Patent of the United States is:

1. In a blower type elevator for chopped material, the combination of a casing, a blower wheel within the casing, a relatively stationary auger conveyor having a shaft and so disposed as to propel material into said casing, and a relatively slow moving apron type conveyor associated with the first conveyor with its longitudinal axis substantially at right angles to that of the auger conveyor, said apron type conveyor having a power input shaft and being separably connected with said auger type conveyor and adapted to swing upwardly relatively to said elevator and said auger conveyor for passage of a material supplying vehicle, a drive extending from said blower wheel to said auger conveyor, and a variable speed power transmission extending from said auger conveyor to said apron type conveyor.

2. In a blower type elevator for chopped material, the combination of a casing, a blower wheel within the casing, means to drive said blower wheel, an auger conveyor having an actuating shaft and so disposed as to propel material into said casing, and a relatively slow moving apron type conveyor associated with the first conveyor with its longitudinal axis substantially at right angles to that of the auger conveyor, said apron type conveyor having a power input shaft and being separably connected with said auger type conveyor and adapted to swing upwardly for passage of a material supplying vehicle, a drive extending from said blower wheel to said auger conveyor, a variable speed power transmission extending from said auger conveyor to said apron type conveyor and including a ratchet wheel on said power input shaft, a ratchet lever associated with said ratchet wheel and having a pawl engaged therewith, cam means on the auger shaft and positioned to be engaged by said ratchet lever, retracting means for yieldingly actuating said ratchet lever in opposition to said cam means, an adjustable stop member positioned to limit the movement of said ratchet lever in the direction urged by said retracting means for determining the effective rate of operation of said apron type conveyor, and a pawl engaged with said ratchet wheel and supported in position to prevent backward movement of said apron conveyor.

3. In a blower type elevator for chopped material, the combination of a casing, a blower wheel within the casing, means to drive said blower wheel, an auger conveyor having a shaft and so disposed as to propel material into said casing, and a relatively slow moving apron type conveyor associated with the first conveyor with its longitudinal axis substantially at right angles to that of the auger conveyor, said apron type conveyor having a power input shaft and being separably connected with said auger type conveyor and adapted to swing upwardly for passage of a material supplying vehicle, a drive extending from said blower wheel to said auger conveyor, a variable speed power transmission extending from said auger conveyor to said apron type conveyor and including a ratchet wheel on said power input shaft, a ratchet lever associated with said ratchet wheel and having a pawl engaged therewith, cam means on the auger shaft and positioned to be engaged by said ratchet lever, retracting means for yieldingly actuating said ratchet lever in opposition to said cam means, and an adjustable stop member positioned to limit the movement of said ratchet lever in the direction urged by said retracting means for determining the effective rate of operation of said apron type conveyor.

4. In a blower type elevator for chopped material, the combination of a casing, a blower wheel within the casing, means to drive said blower wheel, an auger conveyor having an actuating shaft and so disposed as to propel material into said casing, and a relatively slow moving apron type conveyor associated with the first conveyor with its longitudinal axis substantially at right angles to that of the first conveyor, said apron type conveyor having a power input shaft and being separably connected with said auger type conveyor and adapted to swing upwardly for passage of a material supplying vehicle, a drive extending from said blower wheel to said auger conveyor, a variable speed power transmission extending from said auger conveyor to said apron type conveyor and including a ratchet wheel on said power input shaft, a ratchet lever associated with said ratchet wheel and having a pawl engaged therewith, cam means on the actuating shaft and positioned to be engaged by said ratchet lever, and retracting means for yieldingly actuating said ratchet lever in opposition to said cam means.

5. In a blower type elevator for chopped material, the combination of a casing, a blower wheel within the casing, means to drive said blower wheel, an auger conveyor having a shaft and so disposed as to propel material into said casing, and a relatively slow moving apron type conveyor associated with the first conveyor with its longitudinal axis substantially at right angles to that of the auger conveyor, said apron type conveyor having a power input shaft and being separably connected with said auger type conveyor and adapted to swing upwardly for passage of a material supplying vehicle, a drive extending from said blower wheel to said auger conveyor, a variable speed power transmission extending from said auger conveyor to said apron type conveyor and including a ratchet wheel on said power input shaft, a ratchet lever associated with said ratchet wheel and having a pawl engaged therewith, and cam means on the auger shaft and positioned to be engaged by said ratchet lever.

6. In a blower type elevator for chopped material, the combination of a casing, a blower wheel within the casing, means to drive said blower, an auger conveyor having a shaft and so disposed as to propel material into said casing, and a relatively slow moving apron type conveyor associated with the first conveyor with its longitudinal axis substantially at right angles to that of the auger conveyor, said apron type conveyor having a power input shaft and being supported on said elevator and separably connected with said auger type conveyor and adapted to swing upwardly for passage of a material supplying vehicle, a drive extending from said blower wheel to said conveyors and including a variable speed power transmission extending to said apron type conveyor.

7. In a blower type elevator for chopped material, the combination of a casing, a blower wheel within the casing, means to drive said blower wheel, an auger conveyor having a shaft and so disposed as to propel material into said casing, and a relatively slow moving apron type conveyor associated with the first conveyor with its longitudinal axis substantially at right angles to that of the auger conveyor, said apron type conveyor having a power input shaft and being supported on said elevator and connected with said auger type conveyor and adapted to swing upwardly for passage of a material supplying vehicle, a drive extending from said blower wheel to said conveyors and including a variable speed power transmission extending to said apron type conveyor.

8. In a conveyor for use with a blower type elevator for chopped material, said blower having a casing, a blower wheel within the casing, and an auger conveyor having its axis so disposed as to propel material into said casing; said conveyor comprising the combination of a stationary bracket, a bearing rotatably supported in the bracket, a power input shaft in the bearing, a floor fixed in relation to the bearing, an apron movable over the floor and in driven relation to said power input shaft and a variable speed power transmission means in actuating relation to said power input shaft, said floor being swingable with rocking of said bearing, upwardly in relation to said bracket for passage of a material supplying vehicle.

9. In a transmission for use with a blower type elevator for chopped material, said blower having a casing, a blower wheel within the casing, an auger conveyor having its axis so disposed as to propel material into the casing, and an apron type conveyor associated with the auger type conveyor; said transmission comprising the combination of a stationary bracket, a bearing rotatably supported in the bracket, a power input shaft in the bearing, a driving shaft fixed in relation to said bracket, a ratchet wheel on said power input shaft, a ratchet lever associated with said ratchet wheel and having a pawl engaged therewith, cam means on the driving shaft and positioned to be engaged by said ratchet lever, retracting means for yieldingly actuating said ratchet lever in opposition to said cam means, and an adjustable stop member positioned to limit movement of said ratchet lever in the direction urged by said retracting means for determining the effective rate of operation of said power input shaft.

10. In a blower type elevator for chopped material, the combination of a casing, a blower wheel within the casing, means to drive said blower wheel, an auger conveyor having a shaft and so disposed as to propel material into said casing, and a relatively slow moving apron type conveyor associated with the first conveyor with its long longitudinal axis transverse to that of the auger conveyor, said apron type conveyor having a power input shaft and being supported on said elevator and hingedly connected with said auger type conveyor so as to be adapted to swing in a vertical direction, a drive extending from said blower wheel to said auger conveyor and a drive extending from said auger conveyor to said apron type conveyor.

CHARLES WM. HANSEN.

REFERENCES CITED

The following references are of record in the file of this patent:

UNITED STATES PATENTS

| Number | Name | Date |
|---|---|---|
| 2,410,943 | Huddle | Nov. 12, 1946 |
| 2,464,973 | Freiden | Mar. 22, 1949 |